United States Patent [19]

Kim

[11] Patent Number: 6,080,059
[45] Date of Patent: Jun. 27, 2000

[54] MOTOR-VEHICLE PASSENGER-COMPARTMENT AIR-CLEANER

[76] Inventor: Sinil Kim, 4930 Ladera Sarina Dr., Del Mar, Calif. 92014

[21] Appl. No.: 09/421,707

[22] Filed: Oct. 20, 1999

Related U.S. Application Data

[63] Continuation-in-part of application No. 08/875,472, Jul. 24, 1997, and a continuation-in-part of application No. PCT/US96/17094, Oct. 23, 1996.
[60] Provisional application No. 60/006,045, Oct. 24, 1995.

[51] Int. Cl.⁷ ..................................................... B60H 3/06
[52] U.S. Cl. ............................ 454/155; 55/491; 55/502; 454/158
[58] Field of Search .................................. 454/155, 158; 55/385.2, 491, 502

[56] References Cited

U.S. PATENT DOCUMENTS

| 3,941,034 | 3/1976 | Helwig et al. . |
| 4,303,693 | 12/1981 | Driver . |
| 4,394,147 | 7/1983 | Caddy et al. . |
| 4,726,823 | 2/1988 | Brice . |
| 4,737,173 | 4/1988 | Kudirka et al. ........................ 55/507 X |
| 5,169,356 | 12/1992 | Arold . |
| 5,192,346 | 3/1993 | Kowalczyk . |
| 5,266,091 | 11/1993 | McDonald ........................... 454/289 X |
| 5,302,153 | 4/1994 | Winters . |
| 5,350,444 | 9/1994 | Gould et al. . |
| 5,368,620 | 11/1994 | Chiba . |
| 5,720,660 | 2/1998 | Benedetto et al. ................... 454/289 X |

FOREIGN PATENT DOCUMENTS

| 2 636 013 | 3/1990 | France . |
| 28 45 490 | 4/1980 | Germany ................................ 454/158 |
| 35 14038 | 10/1986 | Germany ................................ 454/158 |
| 43 03 693 | 8/1994 | Germany . |
| 6-227249 | 8/1994 | Japan ..................................... 454/158 |
| 9-293216 | 10/1994 | Japan ..................................... 454/158 |

Primary Examiner—Harold Joyce

[57] ABSTRACT

An air filtration method and device which more effectively clean the ambient air being fed into a motor vehicle's passenger compartment, via the existing OEM ventilation and heating/air conditioning system. The notion of more conveniently accessible air filtration appliance is set forth with generic variants showing adaptability to differently configured OEM air outlets. The new technique contemplates treating the air instantly as it is being discharged into the passenger compartment, yet remains compatible with existing OEM air filtration provisions, some of which are provided at the cowl inlet, others are located mid stream within the ducting system.

13 Claims, 7 Drawing Sheets

MOTOR-VEHICLE PASSENGER-COMPARTMENT AIR-CLEANER

This is a continuation-in-part of application Ser. No. 08/875,472, filed Jul. 24, 1997 and a continuation-in-part of Application No. PCT/US96/17094, filed Oct. 23, 1996 and a Provisional Application Ser. No. 60/006,045 filed Oct. 24, 1995.

BACKGROUND OF THE INVENTION

1. Field of the Invention.

This invention relates generally to air-cleaning devices for use in a motor vehicle such as for a car, truck, or airplane; and in particular, to air-cleaning devices of a type adapted to clean the air fed through the passenger-compartment or cockpit thereof, via existing air-ducting aperture(s).

2. Description of the Prior Art

It is commonly accepted that motor-vehicle internal combustion engines must have clean air to operate properly, essentially to avoid costly engine repairs. However, providing clean air for the human occupants of motor vehicle has been largely ignored except in a few expensive luxury motorcars. Presently therefore, the average motorist cannot attain the "luxury" of pre-filtered passenger compartment air; so are constantly exposed en masse to the road-vehicle air pollution such as automobile exhaust fumes, carbon monoxide, hydrocarbons, oxides of nitrogen, soot, rubber-tire dusts, and brake liner asbestos fibers. In addition, mildew and mold tend to grow on heat exchangers of moist air-conditioners or warm heaters, resulting in moldy spores being blown into the passenger compartment through the air outlet ducts and apertures. The moldy smell is most noticeable immediately after the heater or air conditioner fan is first turned on. In addition, the dust and pollutants within the passenger compartment get stirred up by the air blown into the passenger compartment and the dusty, polluted air end up getting recirculated. Perhaps the reason people feel so exhausted and tired after a long drive on crowded highways may be due to the inhalation of automobile exhaust fumes, which include many cancer-causing chemicals. Hence, a system devised to ameliorate this condition would contribute to a motorist's well being and thus increase automobile safety. In the past, practically all efforts to cleanse air being discharged into the passenger compartment have been directed toward placing a filter within the air inlet or ducting system thereto, as have been patented previously.

By Helwit in U.S. Pat. No. 3,941,034 (filed: July 1974), who shows a "filter attachment for automobile passenger compartment air intake"; which is essentially a cowl-intake situated OEM (original equipment manufacture) type arrangement, wherein a laminated porous full-flow paper filter is interspersed with activated charcoal. Therefore, the filter is positionally incapable of filtering, nor can it filter out contaminants recirculating within the vehicle's interior.

By Bach in French Pat. #2,636,013 (filed Feburary 1989), who shows both a screw-on and a tapered universally fitting dust-filter cartridge, either to be adapted to the passenger compartment air-induction inlet of a vehicle; therefore still not addressing the need to filter the contaminants prevailing within the existing ducting passageways.

By Arold in U.S. Pat. No. 5,169,356 (filed: July 1991, to Mercedes-Benz), who shows a "passenger compartment air filter"; which is made to install within an air duct serving to draw in stale air from the passenger compartment for recirculation, so as to treat secondary conditions of the air prior to its being reintroduced into the passenger compartment air/re-entry ducts. However, the system is not retrofitable to aftermarket installation, nor is it ideally situated at the final outlet stage of the air duct system.

By Kowalczyk in U.S. Pat. No. 5,192,346 (filed: July 1992), who shows an "air-purifier pleated filter to stop pollution for passengers inside of a motor vehicle"; which is again designed to provide a replaceable filtering media staged deep within the ducting system.

By Gould in U.S. Pat. No. 5,350,444 (filed April 1993), who shows a "filtered air intake for a passenger vehicle"; wherein an air-inlet and filtering apparatus for the passenger compartment is located at the cowl area beneath the hood, so cannot actually filter out those contaminants prevailing within the duct system where it enters the cabin.

By Chiba in U.S. Pat. No. 5,368,620 (filed August 1993) who shows a "device for cleaning surrounding air fed into passenger compartment of a motor vehicle"; wherein an air-inlet and filtering apparatus for the passenger compartment is located at the cowl area beneath the hood, so like the previous example does not actually filter out those contaminants found within the ducting system where it enters the cabin.

By Hein in German Pat. #4,303,693 (filed: September 1993), who shows an electrostatic cleaning device, with an air filtering element again adapted to fit at the air inlet stage, not at the air outlet stage of the air duct system.

The preceding filtering apparatus also have the disadvantage of requiring OEM (Original Equip. Mfg.) modification to the vehicle structure; hence, are not really adaptable for retrofitting of an existing operating vehicle. In addition, the prior art filtering described cannot effectively capture the mildew and mold tending to fester upon the heat-exchangers of moist air conditioners or heaters blown into the passenger compartment via air outlet ducts.

Therefore, in full consideration of the preceding patent review, there is determined a need for an improved form of device to which these patents have been largely addressed. The instant inventor hereof believes his newly improved passenger air filtering device exhibits certain advantages as shall be revealed in the subsequent portion of this instant disclosure.

SUMMARY OF THE INVENTION

In view of the foregoing discussion about the prior art, it is therefore important to make it pellucid to others interested in the art that the object of this invention is to provide a passenger compartment air cleaning device that can be easily retrofitted into existing motor vehicles without involving any major form of modification to the vehicle. This device is capable of substantially removing dust, fungus spores, allergens, pollutant gases, or odors, known to enter the passenger compartment from outside and contaminate ventilation ducts and heat exchangers as the air is blown through the ventilation system.

It is another object of this invention disclosure to set forth a passenger compartment air cleaning device wherein the under hood to cowl manner of location is understood to be inherently plagues by the adverse contaminant problem identified previously, wherein no manner of air filtration arranged at the inlet of the system ducting can actually deal effectively with contamination downstream therefrom. Accordingly, this disclosure treats the problem by an opposite arrangement, whereby the novel solution is an air-filtration appliance applied at the final air-discharge location, so as to engage the air borne contaminants just as they escape into the passenger compartment. Owing to the different structural configurations of existing ventilation system air discharge baffles, several generic variants are explored.

It is further object of this invention disclosure to set forth a passenger compartment air cleaning appliance, which treats the air as it instantly enters the passenger compartment cabin confines; and, for this reason, is considered even more likely to be properly serviced periodically. Owing to the more convenient and accessible location of my new air filter, it becomes an item, which the average motorist should be able to attend to as well as a mechanic. Hence, a substantial saving in labor cost results. Accordingly, the preferred embodiment of this disclosure, involves substantially tool-free attaching means.

It is still further objective of this invention disclosure to set forth a passenger compartment air cleaning appliance, which will fit variously shaped air-outlet openings in substantially air-tight manner.

Still further objective of this invention disclosure is to set forth a passenger compartment air cleaning appliance, which can be installed by the motorist easily onto airoutlet openings of a motor vehicle.

DESCRIPTION OF THE PREFERRED EMBODIMENT DRAWINGS

The foregoing and still other objects of this invention will become fully apparent, along with various advantages and features of novelty residing in the present embodiments, from study of the following description of the variant generic species embodiments and study of the ensuing description of these embodiments. Wherein indicia of reference are shown to match related matter stated in the text, as well as the Claims section annexed hereto; and accordingly, a better understanding of the invention and the variant uses is intended, by reference to the drawings, which are considered as primarily exemplary and not to be therefore construed as restrictive in nature.

FIG. 3 is a cross sectional side view of the air outlet apparatus, installed over an air outlet with bezel made from resilient material and the attachment mean comprising a.

ITEMIZED NOMENCLATURE REFERENCES

10/10'/10"—car dashboard assembly (upper/front/lower)
11—instrument panel cluster
12—windshield
13—door window glass
14—circular air outlet
15—rectangular air outlet
16—swivel axis
17—vertical axis
18, 18'—louvers of adjustable grille
19—blown air
20—dash board outlet fascia
21—overall air-filtration appliance
22—air entrance side of air filter
23, 23'—air exit side of air filter
24—air filter frame
25—air filter
26—aperture in resilient bezel
27—resilient bezel
29—air duct
30—air filtration appliance attachment means
31, 31'—double terminus distal portion
33—hook-shaped terminus portion of the attachment means
34—adjuster nut
35—shank portion of an attachment means
36—bifurcated terminus portion of an attachment means
37—teeth on shank portion of an attachment means
38—pawl of adjuster nut
39—lever arm for pawl

DETAILED DESCRIPTION OF THE PREFERRED EMBODIMENT

Figure 1:
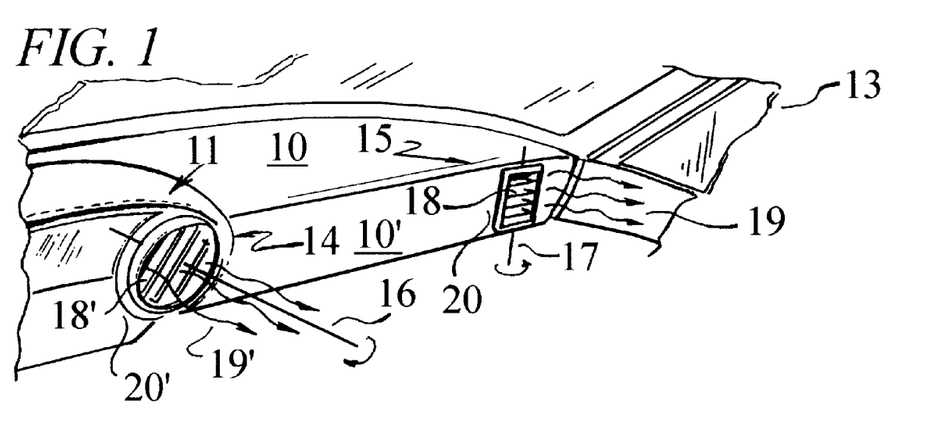
FIG. 1 is a pictorial view of an existing (not necessarily patented) OEM prior art dashboard structural configuration, which passenger compartment air discharge outlet is conventionally absent of any supplemental air filtering appliance thereto.

Initial reference is given by way of prior-art FIG. 1, wherein is exhibited a portion of an OEM transverse dashboard 10, adjacent windshield 12, and contiguous right-side door window glass 13. The left-side of the dashboard 10 generally includes an instrument-panel cluster 11, shown here including an exemplified circular air-duct outlet having grille-like louvers 18' and surround fascia 20. To the far right side of the dashboard is shown an exemplified companion air-duct outlet grille but of the rectangular type, usually comprised of variable-pitch angle louvers 18 which are manually adjustable from closed to open (as shown here); usually both such exemplified air-outlets being arranged in fluid-communication with a common air-ducting system, details of which are not depicted here in as much as the invention is only concerned with the instantly exiting air provisions. Generally however, such automotive type air outlets per FIG. 1 include some manner of air directional-control means, either via a rotational swivel-axis such as 16, as via a vertical or horizontal pivot-axis 17.

Figure 2:
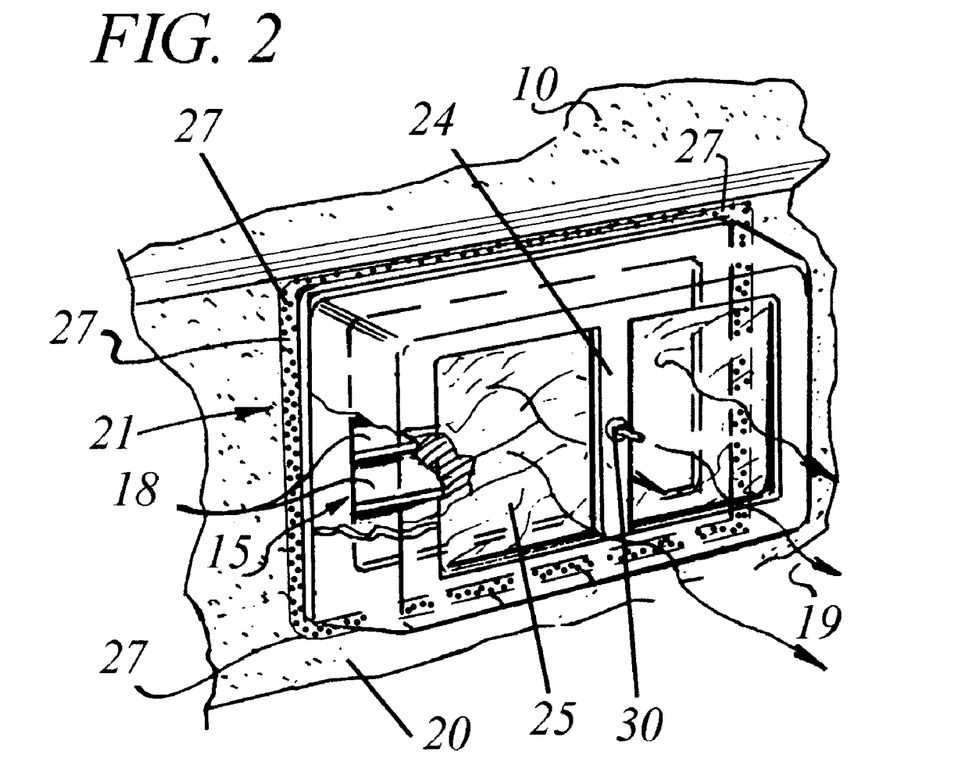
FIG. 2 is a side elevation view of the air filter apparatus, broken away in part, attached to a passenger compartment air discharge outlet.

FIG. 2 is a perspective side-elevation view of my air-filtration appliance 21 shown attached to a motor-vehicle air outlet 15. The air movement as shown by the wavy arrows 19 depict the air blown into the air-filtration appliance 21 through the air entrance side, which is hidden from direct view, and coming out through the air exit side 23 of the air filter 25. Note how bezel 27, made from resilient material, located on the air entrance side 22 of the air filter makes substantially air-tight seal between the dashboard fascia 20 and the air filter 25, even in cases where the dashboard fascia 20 is not perfectly flat, thereby cause substantially all discharging duct-air to pass through air-filter 25. The resilient bezel 27 and the air filter 25 are held tightly against the dashboard fascia 20 by the air filtration appliance attachment means 30, which pushes air filter frame 24 toward the dashboard fascia 20. The power to force air through the filter 25 is supplied by means of a conventional electric air-blower housed within the conventional air-ducting system, all of which is concealed behind OEM dashboard 10/10' of FIG. 1.

Figure 3:
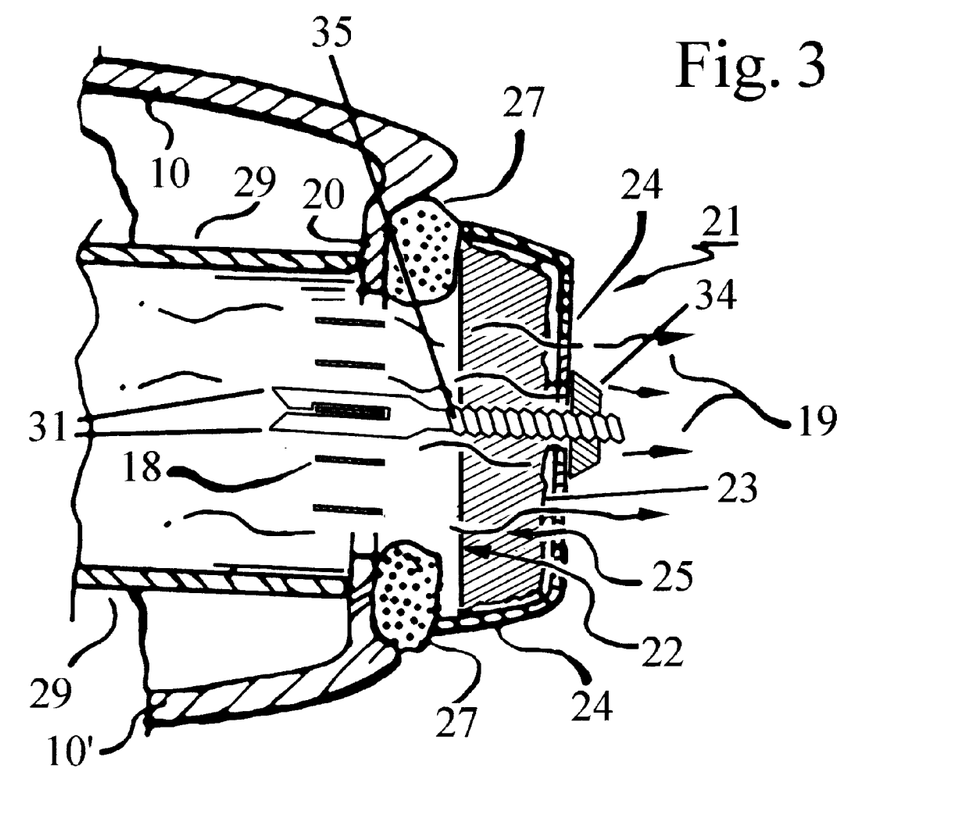

FIG. 3 shows a cross-section view of an air filtration appliance 21 installed over a vehicular air outlet 15 located in the dashboard fascia of the passenger compartment of a motor vehicle. The air filtration appliance includes an air filter 25 with air entrance side 22 and air exit side 23. Note that the air entrance side 22 has a bezel 27 that adjoin air entrance side 22 of the air filter to the dashboard fascia 20 externally around the perimeter of the vehicular air outlet 15. The bezel 27 preferably is comprised of resilient material to enable substantially airtight seal between the air entrance side 22 of the air filter 25 and the dashboard fascia 20. The thickness of resilient material is preferably at least 1 mm. Examples of resilient material of bezel 27 include polymer foam, sponge, synthetic or natural rubber, and synthetic elastomer. The resiliency and thickness of the bezel material allow substantially air-tight seal between the air entrance side 22 of the air filter 25 and the dashboard fascia 20 even in cases where the dashboard fascia 20 is not perfectly flat. However, in some motor vehicle models, it is preferable to include contoured surfaces or a plurality of resilient bezel 27 to enhance tightness of fit without having to modify the rest of the air filter appliance to fit a particular motor vehicle model.

Figure 9:
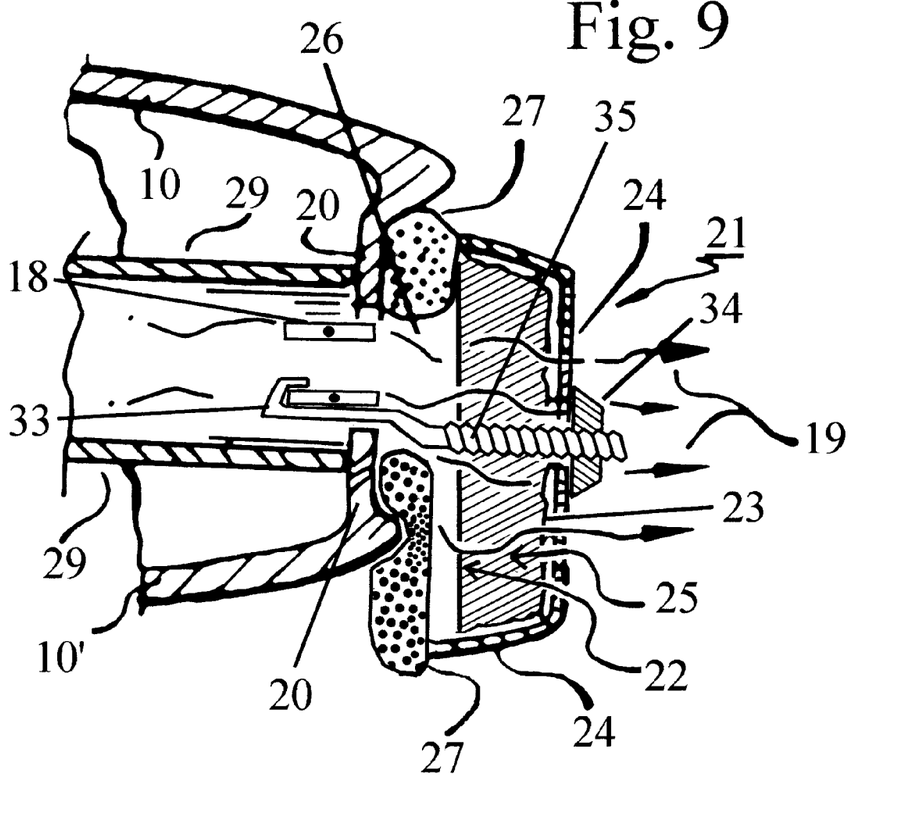
FIG. 9 is a cross sectional side view of a standard-sized air filtration appliance installed over an air outlet with very short vertical dimension.

Each motor vehicle manufacturer and model has its own shape and sized air outlet that opens into the passenger compartment. For example, FIG. 9 shows an air outlet which is very narrow in vertical dimension. A generic-variant of the present invention is to provide a resilient bezel 27 that is contoured, shaped, or provided with one or more aperture 26 to direct air flow 19 from the vehicle air outlet 15 to air entrance side 22 of the filter 25. Provision of such resilient bezel facilitates substantially airtight fit between the dashboard fascia 20 and air entrance side 22 of air filter 25. Provision of such resilient bezel also facilitates use of one or a few standard-sized and shaped air filter 25, circumventing the need to manufacture a large number of variously sized and shaped air filters to fit myriad shapes and sizes of motor vehicle air outlet.

Figure 4:
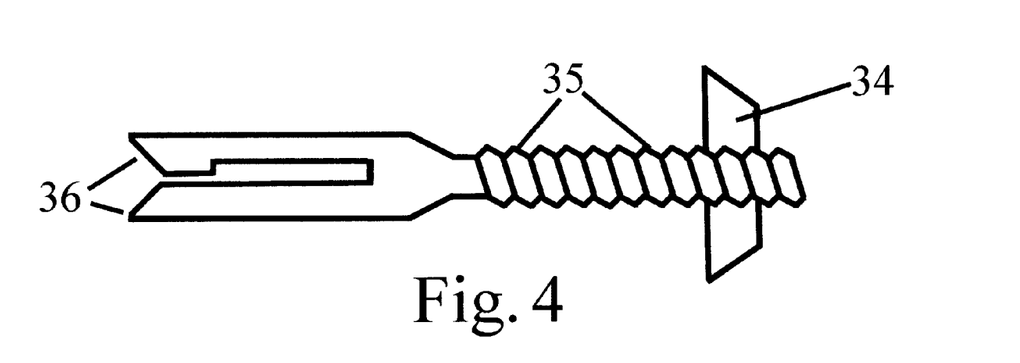
FIG. 4 is side view of an attachment mans with threaded shank portion and adjuster nut.

FIGS. 3 and 4 further shows an attaching means for holding resilient bezel 27 intimately against the dashboard fascia 20. The attaching means is serviceably accessible from within the passenger compartment of the vehicle. Various types of attaching means may be used, including screws, adhesives, thickened polymer-resin dispersion, hook & loop or Velcro fastener that simply mates resilient bezel 27 with dashboard fascia 20; or toggle-bolt-like fastener, T-bar, clip, or hook mechanism that grasps onto one or more of the air-outlet louvers. FIG. 3 and 4 show an air-filtration appliance attachment means in the form of an elongated louver-grasping device. In this embodiment, the louver-grasping device is comprised of three portions. The first portion is a bifurcated terminus portion 36 with opposing paws that protrudes into the vehicle air outlet and grasps or engages the louver in substantially open position as shown. The second portion is a shank portion 35 extending from the terminus portion 36 through air entrance side 22 of the air filter, through the air filter 25 itself, and through air exit side 23 of the air filter. The bifurcated terminus portion 36 is sufficiently flexile as to be forced in a captive manner onto a louver 18 and causing the louver to be held open. The third portion is an adjuster-nut 34 located on the air exit side 23 of the filter that adjustably engages the shank 35, forcing the air filtering appliance 21 and the resilient bezel 27 intimately against the dashboard fascia 20 when the adjuster nut 34 is tightened in relation to the shank portion 35. Filter frame 24 distributes the tightening force over the air filter 25 and the resilient bezel 27.

In one embodiment as shown in FIG. 3 and FIG. 4, the shank portion 35 and the adjuster-nut 34 are both threaded and tightening of the adjuster nut is relation to the shank portion is done by screw action.

Figure 7:
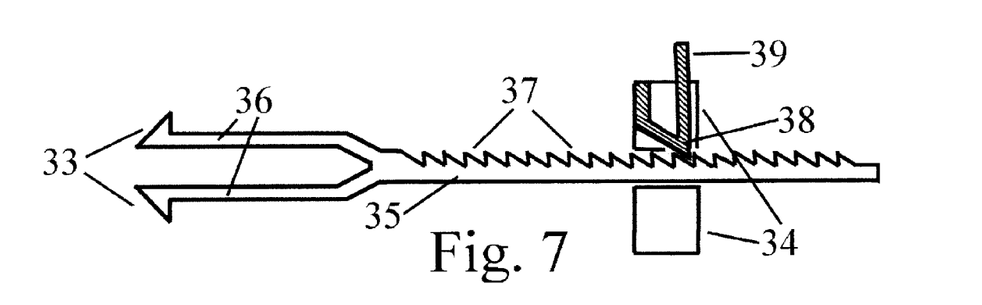
FIG. 7 is a cross sectional side view of an attachment means with plurality of teeth upon the shank portion and adjuster nut with pawl.

An alternate embodiment of adjuster nut and shank is shown in FIG. 7, where a plurality of teeth 37 is disposed upon the surface of the shank portion 35 of the attachment means. In this embodiment, the adjust-nut 34 is comprised of a pawl 38 which lockably engages one of the plurality of teeth 37 to prevent withdrawal of the shank portion 35 from the adjust-nut 34. Tightening operation of the adjuster nut 34 in relation to the shank 35 is performed by simple pulling of the shank 35 through the adjuster nut 34. The pawl 38 engages the teeth 37 on the surface of the shank 35 and ratchets upon the teeth as the shank 35 is cinched tight through the adjuster nut 34.

Figure 8:
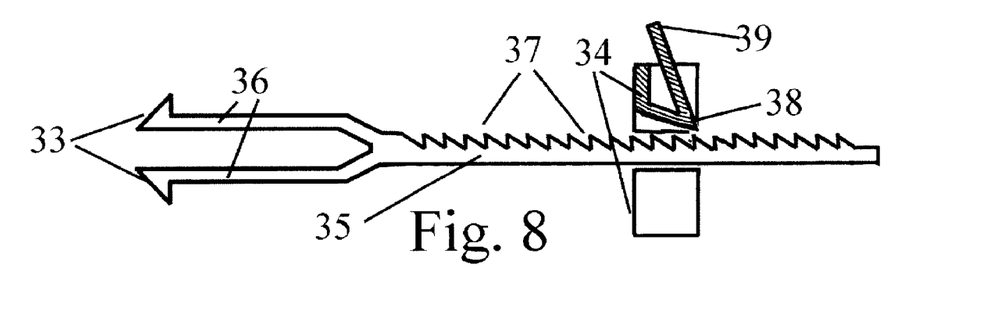
FIG. 8 is a cross sectional side view of an attachment means with plurality of teeth upon the shank portion and adjuster nut with pawl in its released position.

Alternatively, the adjuster nut 34 includes a disengagement means that allows the adjuster nut to disengage the shank portion after the tightening procedure for the purpose of repositioning the air filtration appliance or for removal of the air filtration appliance. FIG. 7 and 8 show an example of such disengagement means. Adjuster nut 34 with a pawl 38 is provided with an attached lever arm 39 that can be depressed as shown in FIG. 8 to move the pawl mechanism 38 off the teeth 37 on the surface of the shank portion 35, allowing the shank 35 to be loosened in relation to the adjuster nut 34. Preferably, the shank portion is made from plastic to allow the excess section 35' that protrudes beyond the adjuster nut to be sheared off with a pair of scissors.

Figure 5:
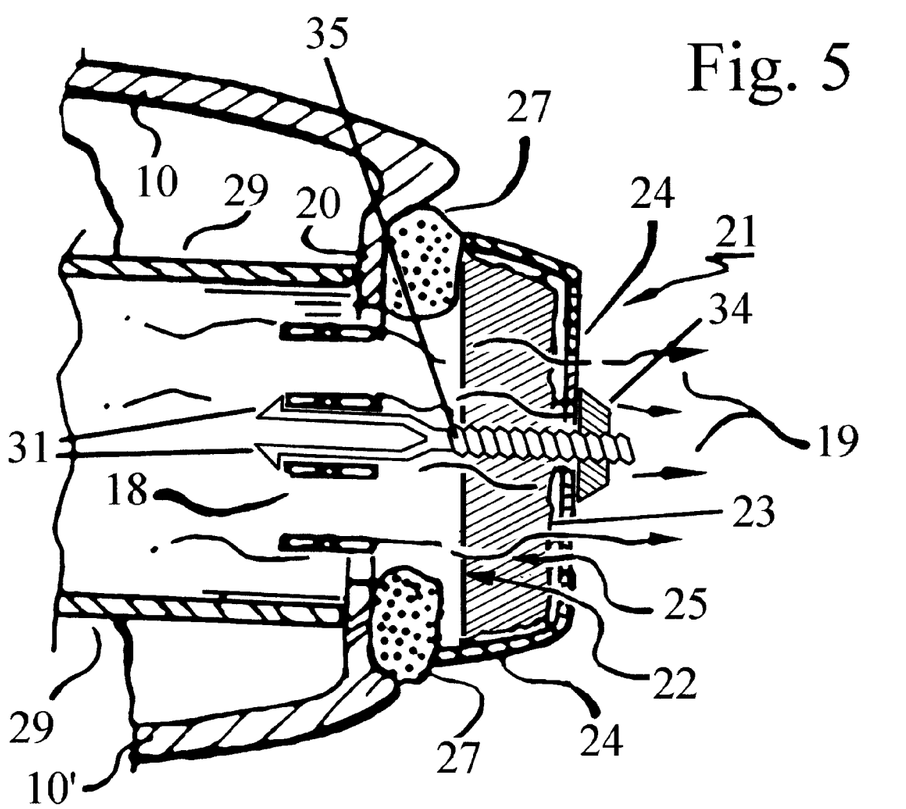
FIG. 5 is a cross sectional side view of the air outlet apparatus, installed over an air outlet with bezel made from resilient material and the attachment mean comprising a double hooking terminus that latch onto more than one louver.
Figure 6:
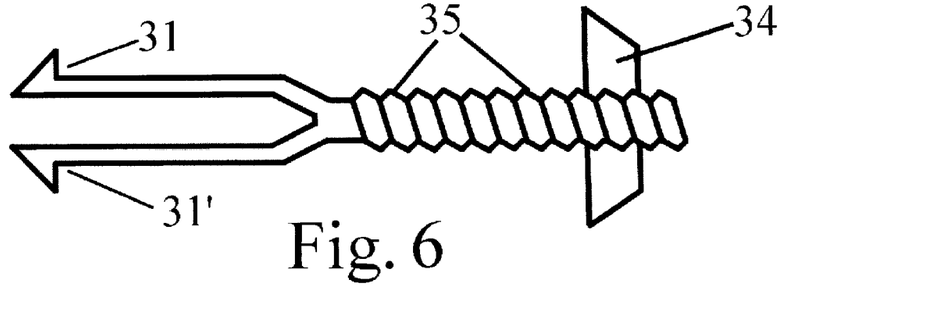
FIG. 6 is a cross sectional side view of the attachment means with double hooking terminus that latch onto more than one louver.

FIG. 5 and 6 depicts still another embodiment the terminus portion of the attachment means. In this embodiment, more than one (in this case, two) terminus portions 31 and 31' latches on to more than one of the louvers 18 and 18'. Use of two or more louvers to anchor the attachment means distributes stress and diminishes still further the small possibility of damaging a louver. In FIGS. 5, 6, 7, 8, and 9 the terminus portions of the louver-grasping device are hook shaped.

In the examples set forth here, the air filter 25 is merely represented as plural layer embodiment of differently made air-filtration materials, which may be of the porous paper composition type comprising random multi-fiberous rovings. Alternate air-filtration materials include non-woven fiber, either charged with static electricity or not charged, woven fabric, and open-cell foam, which are designed mainly to remove particulate matters in air. Gaseous, non-particulate air pollutants, such as volatile organic molecules, odorous chemicals, gasoline, benzene, creosote, and hydrocarbons are not removed by the standard air filtration materials designed for particulate removal. Activated carbon or activated charcoal are better suited for removal of gaseous, non-particulate air pollutants. Activated carbon or activated charcoal removes pollutant gases, odors, and organic gas phase molecules by adsorption. Molecules such as ammonia, formaldehyde, hydrogen sulfide, and sulfur dioxide are also removed by activated carbon or charcoal, but impregnated carbon or activated alumina with $KMnO_4$ (potassium permanganate) is much more efficient for removal of these noxious gases. Zeolite can also be used for removal of air pollutants. Preferably, pleated filter is used because of increased surface area and reduced resistance to airflow. In some applications, it would be desirable to include an aromatic substance, which would provide an air-freshening effect appealing to some users, such as flower scent, pine scent, lemon scent, or other pleasant scents.

Thus, it is readily understood how the preferred and generic-variant embodiments of this invention contemplate performing functions in a novel way not heretofore available nor realized. It is implicit that the utility of the foregoing adaptations of this invention are not necessarily dependent upon any prevailing invention patent; and while the present invention has been well described herein by way of certain illustrated embodiments, it is to be expected that various changes, alteration, rearrangements, and obvious modifications may be resorted to by those skilled in the art without substantially departing from the implied spirit and scope of the instant invention. Therefore, the invention has been disclosed herein by way of example, and not as imposed limitation, while the appended claims set out the scope of the invention sought, and are to be construed broadly as the terminology therein employed permits, reckoning that the invention verily comprehends every use of which it is susceptible.

Accordingly, I claim:

1. An air filtration appliance for use with vehicle air outlet located in the dashboard fascia of the passenger compartment of a motor vehicle, comprising:
   an air filter having air entrance and exit sides, said filter further having one or more bezels located on said air entrance side, such that said bezels adjoin said air entrance side of said air filter to said dashboard fascia externally around the perimeter of said vehicle air outlet; and
   an attaching means for holding said bezels intimately against said dashboard fascia, said attaching means being serviceably accessible from within said vehicle passenger compartment;
   wherein said one or more bezels are comprised of resilient material.

2. The air filtration appliance according to claim 1, wherein said resilient material is at least 1 mm in thickness.

3. The air filtration appliance according to claim 2, wherein said resilient material is chosen from the group consisting of polymer foam, sponge, rubber, and synthetic elastomer.

4. The air filtration appliance according to claim 2, wherein said resilient material includes contoured surfaces that substantially matches the shape of said vehicle air outlet.

5. The air filtration appliance according to claim 2, wherein said resilient material includes one or more apertures whereby said apertures direct air flow from said vehicle air outlet to said air entrance side of said filter.

6. The air filtration appliance according to claim 1, wherein said air filter is comprised of material chosen from the group consisting non-woven fiber either charged or uncharged with static electricity, woven fiber, open-cell foam, activated carbon or charcoal, activated alumina impregnated with $KMnO_4$ (potassium permanganate), and Zeolite.

7. The air filtration appliance according to claim 1, wherein said air filter is pleated.

8. An external air filtration appliance for use with vehicle air outlet having louvers, located in the dashboard fascia of the passenger compartment of a motor vehicle, comprising:
   an air filter having air entrance and air exit sides, said filter further having one or more resilient bezels located on said air entrance side, such that said resilient bezels adjoin said air entrance side of said air filter to said dashboard fascia externally around the perimeter of said vehicle air outlet; and
   an attaching means for holding said bezels intimately against said dashboard fascia, said attaching means being serviceably accessible from within said vehicle passenger compartment;
   wherein said attaching means is an elongated louver-grasping device having:
      one or more terminus portion that protrudes into said vehicle air outlet and engages one or more louvers, thereby causing the louvers to be held substantially open;
      a shank portion extending from said terminus portion, through said air entrance side of the air filter, through said air filter, and through said air exit side of the air filter; and
      an adjuster-nut located on said air exit side that is engaged upon said shank,
   whereby said air-filtering appliance and said resilient bezels are forced intimately against said dashboard fascia by tightening of said adjuster-nut in relation to said shank.

9. An air filtration appliance of claim 8, wherein said terminus portion of said louver-grasping device is hook shaped.

10. An air filtration appliance of claim 8, wherein said terminus portion of said louver-grasping device is bifurcated.

11. An air filtration appliance according to claim 8, wherein said shank and adjuster-nut are threaded.

12. An air filtration appliance according to claim 8, wherein a plurality of teeth is disposed upon the surface of said shank; and said just-nut is comprised of a pawl which lockably engages one of the plurality of teeth to prevent withdrawal of said shank from said adjust-nut.

13. An air filtration appliance according to claim 11, wherein said pawl is further comprised of an attached or linked lever arm whereby a motion of said lever arm disengages said pawl away from the teeth.

* * * * *